(12) United States Patent
Kneisel et al.

(10) Patent No.: US 8,055,367 B2
(45) Date of Patent: Nov. 8, 2011

(54) SYSTEM AND METHOD FOR IDENTIFYING PROCESS BOTTLENECKS

(75) Inventors: Boris Oliver Kneisel, Sandhausen (DE); Miriam Suchet, Sandhausen (DE)

(73) Assignee: SAP AG, Walldorf (DE)

( * ) Notice: Subject to any disclaimer, the term of this patent is extended or adjusted under 35 U.S.C. 154(b) by 920 days.

(21) Appl. No.: 11/869,091

(22) Filed: Oct. 9, 2007

(65) Prior Publication Data
US 2009/0094545 A1    Apr. 9, 2009

(51) Int. Cl.
  *G06F 19/00* (2006.01)
  *G06F 3/048* (2006.01)
  *G06F 9/46* (2006.01)

(52) U.S. Cl. ............ 700/99; 700/96; 715/771; 715/853; 718/104

(58) Field of Classification Search ............ 700/95–97, 700/99, 100, 102; 715/764, 771, 772, 853; 718/1, 100, 102, 104
See application file for complete search history.

(56) References Cited

U.S. PATENT DOCUMENTS

| | | | |
|---|---|---|---|
| 4,134,342 A | 1/1979 | Sakai et al. | |
| 4,306,292 A | 12/1981 | Head, III | |
| 4,884,674 A | 12/1989 | Head, III | |
| 5,216,613 A | 6/1993 | Head, III | |
| 6,039,168 A | 3/2000 | Head, III | |
| 6,076,652 A | 6/2000 | Head, III | |
| 6,338,072 B1 * | 1/2002 | Durand et al. | 718/104 |
| 6,467,605 B1 | 10/2002 | Head, III | |
| 6,693,651 B2 * | 2/2004 | Biebesheimer et al. | 715/837 |
| 6,804,785 B2 | 10/2004 | Steele et al. | |
| 7,046,254 B2 * | 5/2006 | Brown et al. | 345/592 |
| 7,073,137 B2 * | 7/2006 | Hassanin et al. | 715/853 |
| 7,730,428 B1 * | 6/2010 | Yehuda et al. | 715/853 |
| 2006/0079979 A1 | 4/2006 | Giebels et al. | |
| 2006/0079982 A1 | 4/2006 | Giebels et al. | |
| 2010/0144310 A1 * | 6/2010 | Bedingfield et al. | 455/405 |

* cited by examiner

*Primary Examiner* — Crystal J Barnes-Bullock
(74) *Attorney, Agent, or Firm* — Buckley, Maschoff & Talwalkar LLC

(57) ABSTRACT

In some embodiments, a method includes defining a sequence of process resources. Each of the process resources is for performing at least one respective task on a work item. The method further includes calculating a resource utilization metric for each of the process resources. The method also includes displaying a representation of at least a portion of the sequence of process resources. The representation includes image elements that each have a dimension that is inversely proportional to the resource utilization metric for the process resource represented by the image element in question.

23 Claims, 9 Drawing Sheets

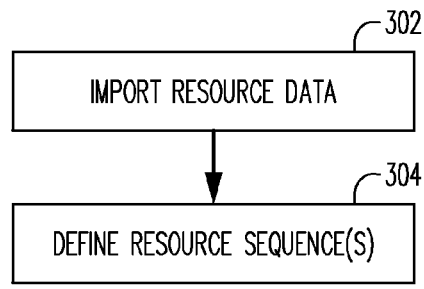
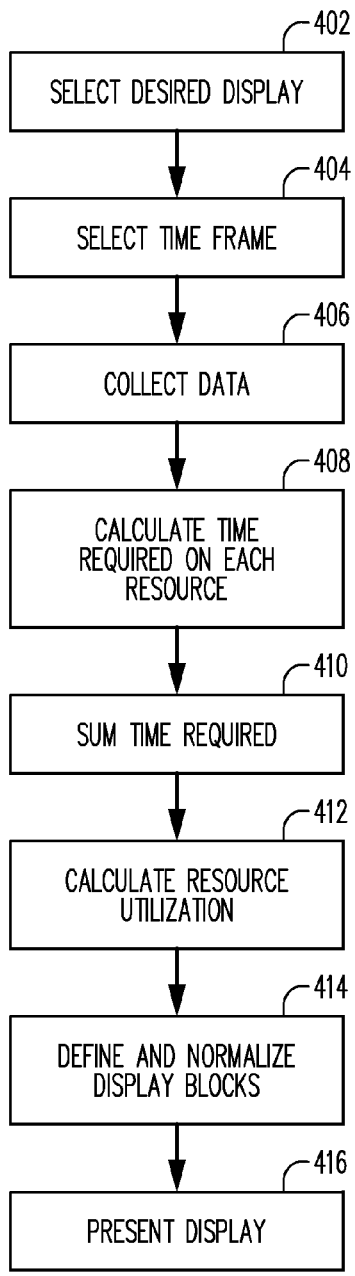

SYSTEM AND METHOD FOR IDENTIFYING PROCESS BOTTLENECKS

FIELD

Some embodiments disclosed herein relate to methods, apparatus, systems, computer program products and/or mediums for use in association with process control systems.

BACKGROUND

A number of theories have been developed about how to improve organizations and processes. One such theory is known as the "theory of constraints".

The theory of constraints (ToC) provides a formula for continuously improving the performance of an organization. In a preliminary step, the goal of the organization is identified, by answering the question, what is it the organization's mission to produce?

Next, in the first step of an ongoing cycle of steps, a constraint is identified, where the constraint is the single factor that limits the organization from producing more of its goal. In the second step, the constraint is "exploited" in that it is made to operate in a manner such that it makes its maximum possible contribution to producing the organization's goal. In the third step, the organization is subordinated to the constraint, in that all other processes are aligned to produce what the constraint needs to operate. In the fourth step, the constraint is "elevated" in the sense that the capacity of the constraint itself is increased. In the next step, which becomes the first step of the next cycle, the next constraint (i.e., the constraint as in effect after elevation of the first constraint) is identified.

The theory of constraints also gives rise to a manufacturing model that is referred to as "Drum-Buffer-Rope" (DBR). The "drum" is the current constraint—the resource that sets the pace for the entire process. The "buffer" is a stock of the material required to feed the drum, and is intended to keep the drum from "running dry". The "rope" is a logistics chain that connects the buffer to a large reservoir of material to keep the buffer at its intended level of supply.

Both for the purposes of the ToC philosophy of continuous improvement and for the DBR manufacturing model, it is crucial to identify constraints or bottlenecks in a process that is being managed. The present inventor now proposes computer-based decision support tools to aid in identifying (i) process bottlenecks, and (ii) mismatches between planned activities and process capabilities.

BRIEF DESCRIPTION OF THE DRAWINGS

FIG. 3 is a flow chart that illustrates a process for performing a set-up phase of operation of the bottleneck identification system.

FIG. 4 is a flow chart that illustrates a process for identifying a bottleneck by use of the bottleneck identification system.

DETAILED DESCRIPTION

To generally introduce concepts of certain embodiments of the invention, a process such as a manufacturing process or a transaction servicing process is modeled as a sequence of process resources, and the expected level of utilization is calculated for each resource employed in the process. The sequence of resources is represented on a computer display by a sequence of image elements. Each of the resources is represented by a respective image element in the sequence of image elements, and the elements that represent the resources are displayed in sizes that are in inverse proportion to the level of utilization for the corresponding resources. Consequently, the most heavily utilized (or "loaded") resource is represented by the smallest image element (or at least the smallest in one dimension) such that the smallest image element indicates which resource may be the "bottleneck" in the process.

In alternative embodiments, displays may be provided to illustrate, for an individual resource, to what extent the resource in question is expected to be loaded during ensuing time periods. The displays may highlight time periods in which the resource is expected to be heavily loaded.

Figure 1:
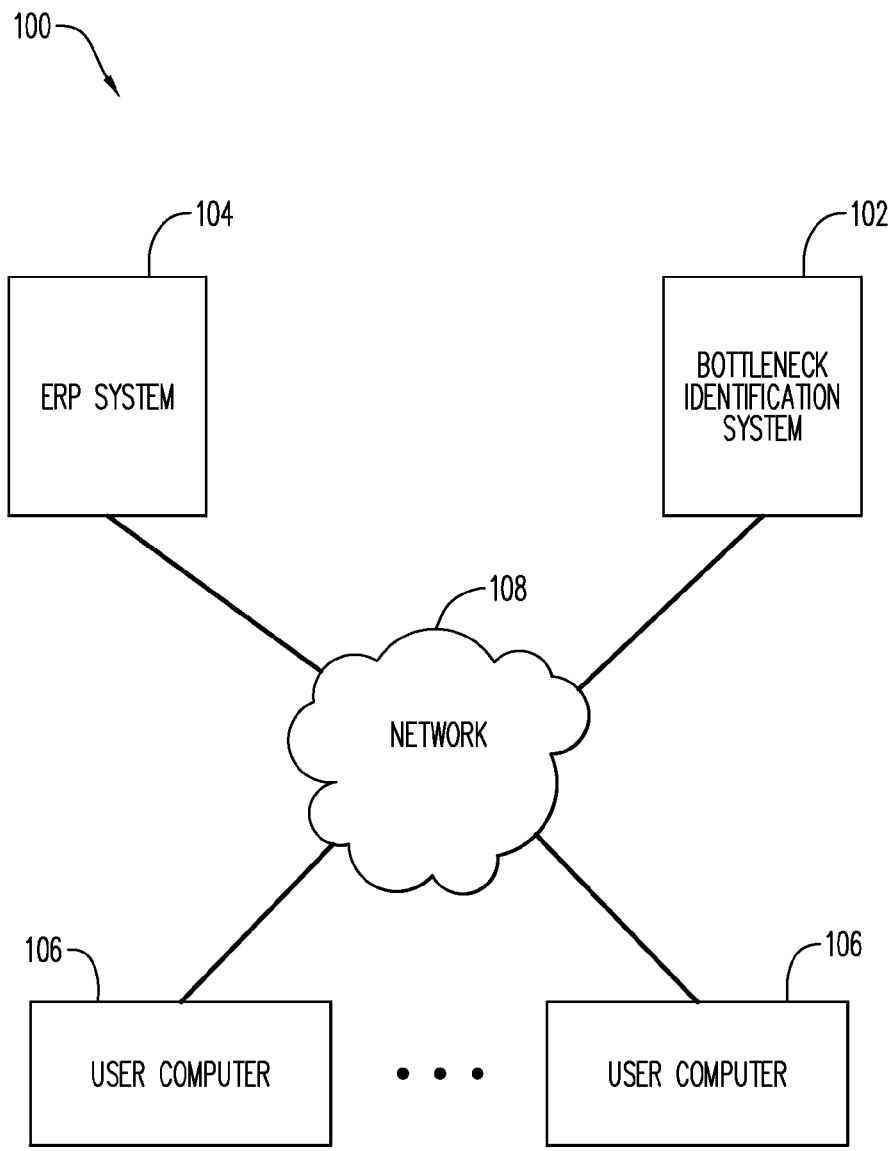
FIG. 1 is a block diagram representation of a data processing system according to some embodiments.

FIG. 1 is a block diagram representation of a data processing system 100 according to some embodiments.

The data processing system 100 may include a bottleneck identification system 102 that operates in accordance with principles of the present invention to provide decision support to one or more individuals who manage a process such as a manufacturing process, a transaction servicing process or another process that processes a work item that passes from one stage of processing to another. As used herein and in the appended claims, "work item" refers to a work piece, an item that is being assembled or a project or job that is being performed in stages. Thus a work item may or may not be a physical object, and may include, for example, an application for financial services, an insurance claim, or the like. Details of the bottleneck identification system 102 will be provided below in conjunction with FIGS. 2-5.

The data processing system 100 may also include an enterprise resource planning (ERP) system 104. In most, and possibly all, of its functions and aspects, the ERP system 104 may be conventional. The block indicated by reference numeral 104 may be deemed to represent both (a) one or more ERP applications and (b) the computer hardware (one or more computer systems) on which the ERP applications run.

The data processing system 100 may further include one or more user computers 106. The user computers 106 may be, for example, conventional personal computers that run conventional browser software that allows the user computers 106 to access server functions provided by either or both of the bottleneck identification system 102 and the ERP system 104. In some embodiments, one or more of the devices represented by the blocks 106 in FIG. 1 may be devices which are not personal computers but which have computing capabilities. For example, the blocks 106 may represent, in addition to or instead of personal computers, one or more mobile devices, such as mobile telephones or PDAs (personal digital assistants). Thus the devices referred to herein as "personal computers" may encompass, for example, devices which provide graphical displays, and which are able to interact over a network with one or more server computers.

Still further, the data processing system 100 may include a conventional data communication network 108, to which the bottleneck identification system 102, the ERP system 104 and the user computers 106 may all be connected (at least from time to time). For example, the data communication network may be an Ethernet network. Any two or more of the other components of the data processing system 100 (i.e., the bottleneck identification system 102, the ERP system 104 and the user computers 106) may be in data communication with each other either on a constant, ongoing basis, or on an occasional basis as required for operation of the data processing system 100.

In some embodiments, one or more portions of the data processing system 100 may be used without one or more other portions of the data processing system 100. In some embodiments, the data processing system 100 (or portion(s) thereof) may be used in association with one or more other systems (not shown) or portion(s) thereof.

In some embodiments (and as described below, for instance, in connection with FIG. 2), the data processing system 100 may comprise one or more processors. As used herein, a processor may be any type of processor. For example, a processor may be programmable or non programmable, general purpose or special purpose, dedicated or non dedicated, distributed or non distributed, shared or not shared, and/or any combination thereof. If the processor has two or more distributed portions, the two or more portions may communicate with one another through a communication link. A processor may include, for example, but is not limited to, hardware, software, firmware, hardwired circuits and/or any combination thereof.

Figure 2:
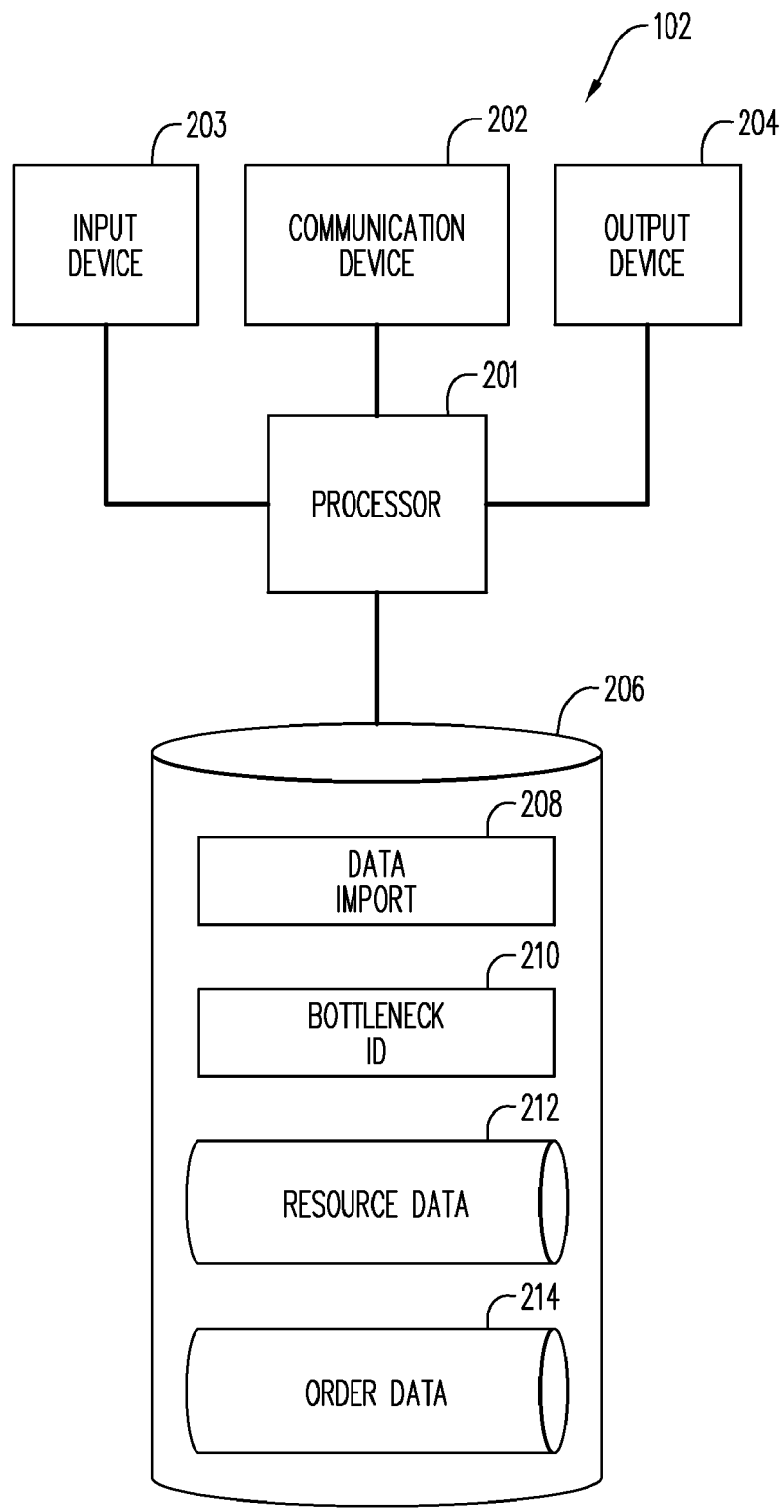
FIG. 2 is a block diagram representation of a bottleneck identification system that is part of the system of FIG. 1.

FIG. 2 is a block diagram representation of the bottleneck identification system 102. In some embodiments, one or more of the ERP system 104 and the user computers 106 may have an architecture (or at least a hardware architecture) that is the same as and/or similar to the architecture of the bottleneck identification system 102.

Referring to FIG. 2, in accordance with some embodiments, the bottleneck identification system 102 includes a processor 201 operatively coupled to a communication device 202, an input device 203, an output device 204 and a storage device 206.

In some embodiments, the processor 201 may execute processor-executable program code to provide one or more portions of the one or more functions disclosed herein and/or to carry out one or more portions of one or more embodiments of one or more methods disclosed herein. In some embodiments, the processor 201 may be a conventional microprocessor or microprocessors.

The communication device 202 may be used to facilitate communication with other devices and/or systems. In some embodiments, communication device 202 may be configured with hardware suitable to physically interface with one or more external devices and/or network connections. For example, communication device 202 may comprise an Ethernet connection to a local area network (e.g., the network 108 shown in FIG. 1) through which the bottleneck identification system 102 may receive and transmit information relative to other components of the data processing system 100.

The input device 203 may comprise, for example, one or more devices used to input data and/or other information, such as, for example: a keyboard, a keypad, track ball, touchpad, a mouse or other pointing device, a microphone, knob or a switch, an infra-red (IR) port, a barcode scanner, an RFID (radio frequency identification) reader, etc. The output device 204 may comprise, for example, one or more devices used to output data and/or other information, such as, for example: an IR port, a docking station, a display, a speaker, and/or a printer, etc.

The bottleneck identification system 102, and particularly its processor 201, may receive information from any source (s). In some embodiments, the information may be received from one or more sources within the bottleneck identification system 102. In some embodiments, information may be received via the communication device 202 (e.g., from other components of the data processing system 100, such as the ERP system 104). In some embodiments, information may be received from the storage device 206. In some embodiments, information may be supplied via a user interface. In some embodiments, a user interface may comprise a graphical user interface. In some embodiments, the information may be received from one or more sources outside the bottleneck identification system 102. In some embodiments, the information may be received from one or more sources within the bottleneck identification system 102 and one or more sources outside the bottleneck identification system 102. In some embodiments, information may be received from one or more sources in lieu of and/or in addition to one or more of the sources described herein.

The storage device 206 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 206 may store one or more programs 208, 210, which may include one or more instructions to be executed by the processor 201 to perform one or more functions of one or more embodiments of the invention as disclosed herein and/or one or more portions of one or more embodiments of one or more methods disclosed herein.

For example, the program 208 may allow the bottleneck identification system 102 to receive and/or import data (e.g. from ERP system 104) that defines a sequence of processes and/or process resources, and characteristics of the processes and/or process resources. Examples of process resources are machine tools used to manufacture a work item. The program 208 may also allow the bottleneck identification system 102 to receive and/or import data indicative of planned activities for the process resources. For example the latter type of data may include orders for goods to be manufactured and indications as to when and to what extent the orders will result in utilization of machine tools.

The program 210 may allow the bottleneck identification system 102 to manipulate the data imported via the program 208 so that the bottleneck identification system 102 may indicate process bottlenecks and/or other aspects of resource utilization to a user of the bottleneck identification system 102.

In some embodiments, the storage device 206 may store one or more other programs (not separately indicated), such as one or more operating systems, database management systems, other applications, other information files, etc., for operation of the bottleneck identification system 102.

The storage device 206 may store one or more databases 212, 214. For example, database 212 may store data that indicates characteristics of process resources such as machine tools used in a manufacturing process. The data in the database 212 may also store data that represents interrelationships among process resources, such as the order in which a work item progresses through a sequence of machine tools (i.e., the order in which machine tools operate on a work item). For example, for each machine tool or other process resource, the data concerning the machine tool or other process resource may include the preceding process resource (i.e., the process resource that processes the work item immediately before the work item is processed by the current process resource) and the succeeding process resource (i.e. the process resource that processes the work item immediately after the work item is processed by the current process resource). Other data concerning the process resources that may be stored in the database may include the capacity of the process resource, which may be indicated by number of work items per unit time that the process resource is able to process. Still other data concerning each process resource may indicate the amount of time that each process resource requires to perform its processing relative to a work item (i.e., time required by the process resource to complete a task). Alternatively, the amount of time required for a particular resource to complete a task may, at least in some cases, vary depending on attributes of the task to be performed. That is, the task to be performed by a process resource may vary from order to order, and therefore the time to complete the task may vary from order to order, and may be an attribute represented by the order data to be described below rather than being an attribute of the process resource itself. Similarly, the capacity of a process resource may be partly a function of one or more attributes of the particular task required of the process resource in connection with a particular order.

The resources represented by the data in database 212 are not necessarily physical objects. For example, at least some of the resources may be organizational and/or human resources. In one example, the resources may include machine tools, qualified operators for the machine tools, test equipment and transportation equipment such as forklifts.

In some embodiments, some or all of the data in the resource database 212 may be imported by the bottleneck identification system 102 from the ERP system 104.

The data in the database 214 may represent a group of orders or another set of tasks to be processed through a production system (e.g., a manufacturing facility) that is to be managed using the data processing system 100. The data for each order or other task may specify the number of work items to be produced or processed, as well as the timing of production, and possibly also the demands each work item will place on the process resources required to produce or process the work item.

In some embodiments, some or all of the data in the order database 214 may be imported by the bottleneck identification system 102 from the ERP system 104.

As used herein a "database" may refer to one or more related or unrelated databases. Data and/or other information may be stored in any form. In some embodiments, data and/or other information may be stored in raw, excerpted, summarized and/or analyzed form.

In some embodiments, one or more of the databases may be used in carrying out one or more portions of one or more functions disclosed herein and/or to carry out one or more portions of one or more embodiments of one or more methods disclosed herein.

Other programs and/or databases may also be employed.

FIG. 3 is a flow chart that illustrates a process for performing a set-up phase of operation of the bottleneck identification system 102.

At 302 in FIG. 3, the bottleneck identification system 102 operates to import (e.g., from the ERP system 104) the resource data as described above in connection with resource database 212. At 304 in FIG. 3, the bottleneck identification system 102 defines a sequence of the resources in such a way as to model a production or other process to be managed with the assistance of the data processing system 100. This may be done automatically by the bottleneck identification system 102 based on the data imported at 302 (e.g., based on preceding and succeeding resource information associated with each resource). In addition or alternatively, the sequence of resources may be defined at least partially in response to direct user input into the bottleneck identification system 102 and/or may be imported from the ERP system 104 or from another source.

One example of a sequence of resources would be a sequence of machine tools arranged in the order in which the machine tools are required to operate to produce a work item. Another example of a sequence of resources (which may exist in parallel with the example sequence described in the preceding sentence) would be a sequence of groups of qualified tool operators arranged in the order in which the corresponding machine tools are required to operate to produce a work item. Another example of a sequence of resources would be a sequence of organizational departments arranged in the order in which the departments process a transaction such as a loan application or a mail order transaction.

FIG. 4 is a flow chart that illustrates a process for identifying a bottleneck by use of the bottleneck identification system 102.

Figure 5:
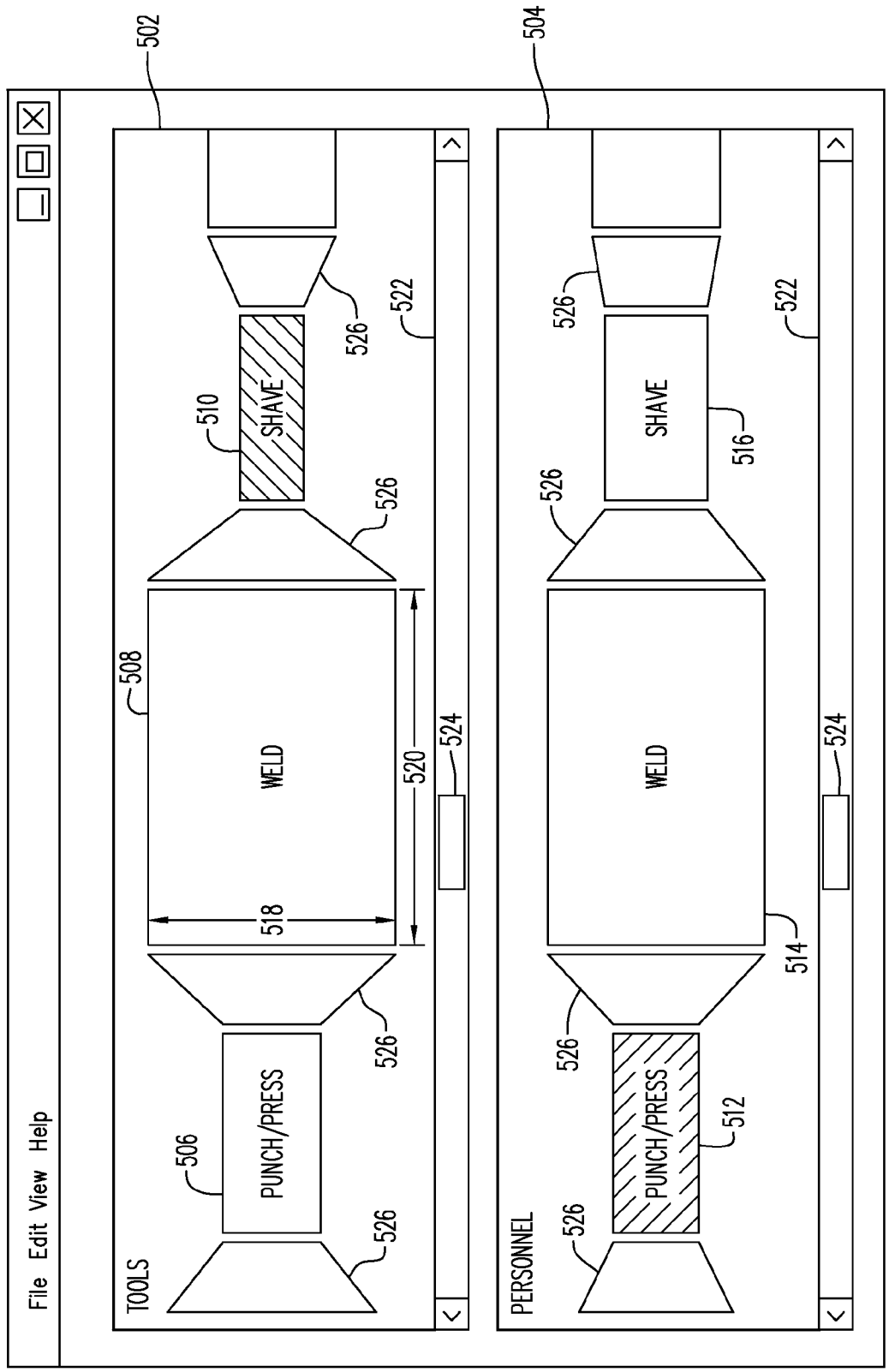
FIG. 5 illustrates an example decision support screen display that may be produced in the process of FIG. 4.

At 402 in FIG. 4, the bottleneck identification system 102 receives input from a user to indicate that the user wishes the bottleneck identification system 102 to provide a graphical display that illustrates an actual or potential bottleneck or bottlenecks in the production or processing system to be managed with the aid of the data processing system 100. (An example of such a graphical display is shown in FIG. 5, which will be described in detail below. The display of FIG. 5 will be referred to as a "bottleneck display".) The user input referred to in step 402 (and elsewhere herein) may be accomplished via a user interface. In some embodiments, a user interface may comprise a graphical user interface. In some embodiments, a user interface may include a personal computer (e.g., one of the user computers 106) that executes a browser program, receives signals from one or more input devices, for example, a mouse and/or keyboard, supplies signals to one or more output devices, for example, a display. In addition or alternatively, the user interface may be provided via the input device(s) 203 and the output device(s) 204 shown in FIG. 2. The indication that the user desires the bottleneck display may be provided, for example, by the user selecting an item from a menu, which is not shown.

At 404 in FIG. 4, the user is prompted by the bottleneck identification system 102 to select, and enters data or selects options to indicate, a time frame to be illustrated by the bottleneck display. For example, a menu, which is not shown, may present the user with time frame options such as the next 8 hours, one day, one week, one month, etc., and the user may select the desired time frame by selecting one of the options. Alternatively, the time frame may be pre-selected by and for a given user based on a pre-set personal options setting established by the user for the bottleneck identification program 210.

At 406 in FIG. 4, the bottleneck identification system 102 (and/or its processor 201) collects the order data that is relevant to the time frame selected at 404. That is, data is collected to reflect all orders that have been scheduled to be at least partially processed during the selected time frame. The order data collected at 406 may already be present in the order database 216 or may be imported as required in view of the selected time frame.

At 408, using the data collected at 406, the bottleneck identification system 102 (and/or its processor 201) calculates, for each order, the amount of time the order will require from each of the resources in the system to be managed with the aid of the data processing system 100. The calculation at 408 may be based on both characteristics of the order in question, such as the size of the order (e.g., number of work items to be produced), as well as characteristics of the resource in question, such as the throughput of which the resource is capable.

At 410, the bottleneck identification system 102 (and/or its processor 201) sums, over each resource, the total time required from the resource by all of the orders relevant to the time frame selected at 404. That is, for each resource, a relevant subset of the data resulting from step 408 is summed.

The data resulting from step 410, for each resource, represents, or may be readily converted into, data indicative of the extent to which the resource's capacity will be required during the selected time frame. Based on this data, and also based on the "total capacity" of the resource, a resource utilization percentage is calculated at 412 for each resource. In practice, there may be number of different ways in which the "resource utilization" (RU) metric may be calculated. For example, RU may be calculated as the quotient of the expected resource load generated at 410 divided by a theoretical maximum load for the resource in question.

To give a concrete example, suppose resource i consists of three punch press tools with a theoretical up time of 20 hours per day. Further, the selected time period may be assumed to be the next 24 hours, and the expected load for resource i is assumed to have been calculated as 45 machine-hours. Then RU for resource i may be calculated as $45/(3*20)=0.75$.

In other embodiments, RU may be calculated as the quotient of expected resource load divided by a maximum load as determined for the resource based on actual experience with the resource during periods of maximum throughput. Thus RU in this case may reflect experience with actual operating conditions rather than a theoretical maximum load.

Those who are skilled in the art will recognize that RU may be calculated in other ways. In general, and for the purposes of the appended claims, the resource utilization metric is a calculated amount that reflects the proportion of the full capacity of the resource that is expected to be utilized during the selected time frame. As noted above, "full capacity" may be established as a theoretical value, or from practical experience and observation, or by another approach or approaches.

At 414 in FIG. 4, the RU value for each resource is used to determine at least one dimension for an image element that is to represent the resource in question in the desired display. In some embodiments, for example, the Y-axis dimension of each image element may be scaled in inverse proportion to the RU value for the resource that the image element represents. Thus 1/RU may be calculated for each resource and the values of 1/RU may be scaled and normalized to fit desired dimensions for a display or display window. If RU happened to be zero for a given resource, for scaling and normalizing purposes, 1/RU may be defined as equal to "100", which would then be scaled to produce the largest possible Y-axis dimension for the desired display format. (For consistency of presentation, any value of 1/RU that is greater than 100 (i.e., for $RU \leq 0.01$) may also be scaled to equal 100.) The scaling of the Y-axis dimension need not be linear. As will be seen from the discussion below of FIG. 5, scaling the Y-axis dimension of the image elements in inverse proportion to the RU value for the corresponding resources causes the image elements for highly loaded resources to be small in size, thus visually representing the highly loaded resources as "bottlenecks" or potential bottlenecks.

At 416 in FIG. 4, the scaled and normalized dimension values calculated at 414 are used to construct a visual screen display to graphically represent one or more sequences of process resources in a graphical user interface provided directly or indirectly by the bottleneck identification system 102 (e.g., on output device 204 and/or on a display component on one of the user computers 106). FIG. 5 shows one example of such a screen display, which may be useful for providing decision support to a user or users who are managing a production facility or other process.

In the example shown in FIG. 5, it is assumed that aspects of a manufacturing process are being represented, including one sequence of machine tool resources (window 502 in FIG. 5) and another sequence (window 504 in FIG. 5) of pools of qualified operators of the machine tools. In the portion of the sequences shown in FIG. 5, machine tool groups for (a) punching and pressing, (b) welding, and (c) shaving operations are represented, respectively by image elements 506, 508 and 510 in window 502. The sequence of image elements 506, 508, 510 from left to right indicates that, in the illustrated process flow, welding immediately follows punching/pressing, and shaving immediately follows welding. In the window 504, image elements 512, 514 and 516 respectively represent available pools of qualified operators for the punching/pressing tools, the welding tools and the shaving tools. Thus the process sequence illustrated in window 504 is a parallel sequence to the sequence represented in window 502, with the sequence in window 504 representative of human resources available for the process flow illustrated in window 502.

It will be noted that in the example shown in FIG. 5, each of the image elements 506, 508, 510, 512, 514 and 516 is presented as a rectangle. The rectangles are aligned in orientation with the windows 502, 504 and with the display itself, and have Y-axis dimensions and X-axis dimensions, which are (in the particular case of image element 508) indicated respectively by two-headed arrows 518 and 520. In accordance with the above discussion of 414, the respective Y-axis dimension of each image element 506, 508, 510, 512, 514 and 516 is scaled in inverse proportion to the RU value for the process resource represented by the image element. In some embodiments, the X-axis dimension of each of these image elements is scaled in proportion to the length of time required for a work item to pass through the process stage in question. Thus the width of each rectangular image element indicates processing time required for a work item to pass through the resource in question, and the height of the rectangular image element represents the currently unused capacity (for the time frame in question) for the resource; in other words, image element height inversely corresponds to degree of loading. In this particular example, the welding machine tool group is assumed to have been the most lightly loaded resource with respect to the time frame in question, so that the welding machine tool image element 508 has the maximum height allowed by the window 502.

It will be noted that each window 502, 504 is equipped with a slide-bar 522. Each slide bar 522 includes a slide bar element 524 which may be manipulated with a cursor (not shown) to horizontally scroll within the respective window 502 or 504. For example, the user may move the slide bar element 524 to the left to view resource image elements that are upstream from the resource image elements that are currently presented in the respective window 502 or 504. On the other hand, the user may move the slide bar element 524 to the right to view resource image elements that are downstream from the resource image elements that are currently presented in the respective window 502 or 504.

In some embodiments, a button, which is not shown, may be provided in the display to cause scrolling of the two windows to be synchronized. When such a button is actuated (e.g., by the user's operation of a pointing device), then interacting with either of the two slider bar elements 524 causes both windows to be scrolled in tandem.

To enhance the aesthetic effect and readability of the resource sequence display, there may be trapezoidal image elements 526 present between each adjoining pair of rectangular image elements. The trapezoidal image elements may provide a visual transition and connection between adjoining rectangular image elements. The two parallel (vertical) sides of each trapezoidal image element 526 may have the same length (i.e., height) as the height of the rectangular image element that is immediately adjacent to the trapezoid vertical side in question.

For purposes of the example shown in FIG. 5, it is assumed that the shaving machine tool resource group represented by image element 510 is the most heavily loaded resource (highest RU metric) involved in the illustrated manufacturing process. To visually underline the point that the shaving machine tool resource group may be the bottleneck or constraint for the entire process, the image element 510 which represents that resource may be color coded (as represented by shading in image element 510) so as to have a contrasting color relative to the other rectangular image elements. For example, the "bottleneck" image element (assumed to be 510 in this case) may be colored red, whereas the other (or most of the other) rectangular image elements may be white or grey. The color coding of the bottleneck image element may visually reinforce the information provided by the low height (small Y-axis dimension) of that image element.

It is further assumed for the purposes of the FIG. 5 example screen display that the group of qualified operators for the punch/press machine tools—i.e., the resource represented by image element 512—is the second most heavily loaded resource. For that reason, the image element 512 may also be contrastingly color coded (e.g., light red or pink), as indicated by the shading in image element 512, to emphasize the point that the punch/press operators resource is a potential bottleneck.

It will be appreciated from prior discussion that a sequence of processes may have more constituent elements than can be displayed within a window at one time. (For example, the example shown in FIG. 5 assumes that there are process resources both upstream and downstream from those represented in the view provided by FIG. 5.) Thus, with respect to any particular positioning of the slide element 524, it may be the case that the currently viewable resource image elements do not include the element which represents the process bottleneck. Therefore, to increase the functionality of the display, it may include an additional feature, which is not shown, but which represents a small-scale or thumbnail display of the entire image element sequence or sequences, including image elements not currently visible in the window view. In such a thumbnail display, color coding of the bottleneck or near-bottleneck image elements may aid the user in navigating within the window view(s) to find, recognize and be informed of the identity of the bottleneck and near-bottleneck.

In the example shown in FIG. 5, two windows are presented, each corresponding to a respective sequence of resources that pertains to the process to be managed. In other examples/embodiments, only one sequence may be displayed at a time, or three or more sequences may be displayed at a time. For example, the display of FIG. 5 may be augmented with another window to similarly present the degree of loading of various types of test equipment that is used in the process. In addition or alternatively, another window may similarly present the degree of loading of various items of transportation equipment, such as forklifts. As another alternative, image elements to represent testing equipment and/or transportation equipment or the like may be inserted at appropriate points in the machine tool and/or personnel sequences. To the extent that such equipment is shared between different stages of the process, it may be represented by more than one image element. The image elements that represent a single (e.g., test or transportation) resource may be sized proportionally to the degree of loading at the respective stages of the process.

In some embodiments, all of the rectangular image elements may have the same width (X-axis dimension). That is, the rectangular image elements need not be proportioned according to the time required for the work item to pass through the corresponding resource. In other embodiments, the widths of the rectangular image elements may be varied, but on a basis other than the time required to process a work item through the corresponding process resource.

Although the example of FIG. 5 shows the resource sequences represented in a horizontal direction, the sequence representation may alternatively extend in a vertical direction. In such a case, it would be preferable that the X-axis dimension rather than the Y-axis dimension reflect the degree of loading (utilization).

In some embodiments, the trapezoidal linking image elements may be replaced with suitably curved linking image elements, or may be dispensed with entirely. Moreover, it need not necessarily be the case that rectangular image elements be used to represent the process resources.

The example of FIG. 5 is illustrative of a manufacturing process and resources needed therefor. Alternatively, however, a display in the format of FIG. 5 may be used for representing other types of processes, including paper or data-based processes such as handling of business projects that involve a number of different parties or departments operating in sequence and passing a project from party to party. Examples of such projects include consulting engagements, loan application handling, insurance claim handling, hospital procedure coding and billing, etc. Other processes to which such a bottleneck identification display may be applied may include logistics and distribution planning and execution for physical goods, products and materials; travel planning and implementation for, e.g., personal travel, business travel, marketing campaign travel, securities road-shows, touring entertainment companies and musical groups, etc.; and conference room booking and/or office space assignments.

The hardware arrangement shown in FIG. 1 may be modified in a number of ways. For example, the ERP system software and the bottleneck identification system could both run on the same computer hardware. Alternatively, the computer 102 which runs the bottleneck identification system could be eliminated from the data processing system 100 in favor of running the bottleneck identification system on one or more of the user computers 106.

In a particular example described hereinabove, the time period selected for analysis is in the future. Alternatively, however, a bottleneck identification display according to the invention may be produced based on historical utilization data, and with respect to a selected time period that is in the past. In this way, the bottleneck identification system may be utilized to analyze past operations of a process environment.

In other cases, the bottleneck identification display may be based on hypothetical data to allow for analysis of "what if" scenarios. In still other cases, the user may define a new configuration of system resources and may direct the bottleneck identification system to apply real or hypothetical order data to the new configuration as a simulation of possible changes to a process environment. When the bottleneck display as disclosed herein is used in connection with simulations, it may be useful in designing plants and manufacturing facilities, and/or in optimizing shop floor layouts.

In some embodiments, the bottleneck identification system may operate to define and/or to display different sequences of resources at different times and/or to different users at the same time or at different times. In some embodiments, the sequence of resources to be displayed to a given user may be personalizable by the user, or may be varied depending on changing circumstances, such as the nature and sequence of tasks to be performed in connection with various orders. In some embodiments, each user may be allowed to switch among a number of resource sequences that the user has defined and/or to switch between the user's personalized sequence of resources and a "system preferred" sequence of resources defined by a system administrator or selected as the most popular sequence of resources from among the various users' individually defined sequences, or selected in some other manner. Various sequences of resources defined at various times and/or by various users may be stored and/or archived for future reference and review.

In the example bottleneck identification display shown in FIG. 5, the sequence of tool resources is displayed above the display of a parallel sequence of human resources. Such an arrangement of the two parallel sequences may be particularly apt in a situation in which the processing facility is equipment-intensive. In other situations, e.g., when the process is labor intensive, it may be preferable for a sequence of human resources to be displayed above a parallel sequence of equipment resources.

With the bottleneck identification system described hereinabove, the data processing system may be used to automatically analyze loading patterns for the process resources. The system may operate to visually present the results of the analysis to the user in an intuitive way so that the user can readily recognize bottlenecks or potential bottlenecks in the process. This may also aid the user in identifying the system constraint(s) for purposes of improving operations in accordance with the theory of constraints. Thus the bottleneck identification system may prove to be a valuable decision support tool for process management. Moreover, the system may be further operable to suggest solutions for exploiting or elevating constraints identified by the system. In some embodiments, the suggested solutions may be based on case-based reasoning following from analysis of solutions developed in the past.

Figure 6:
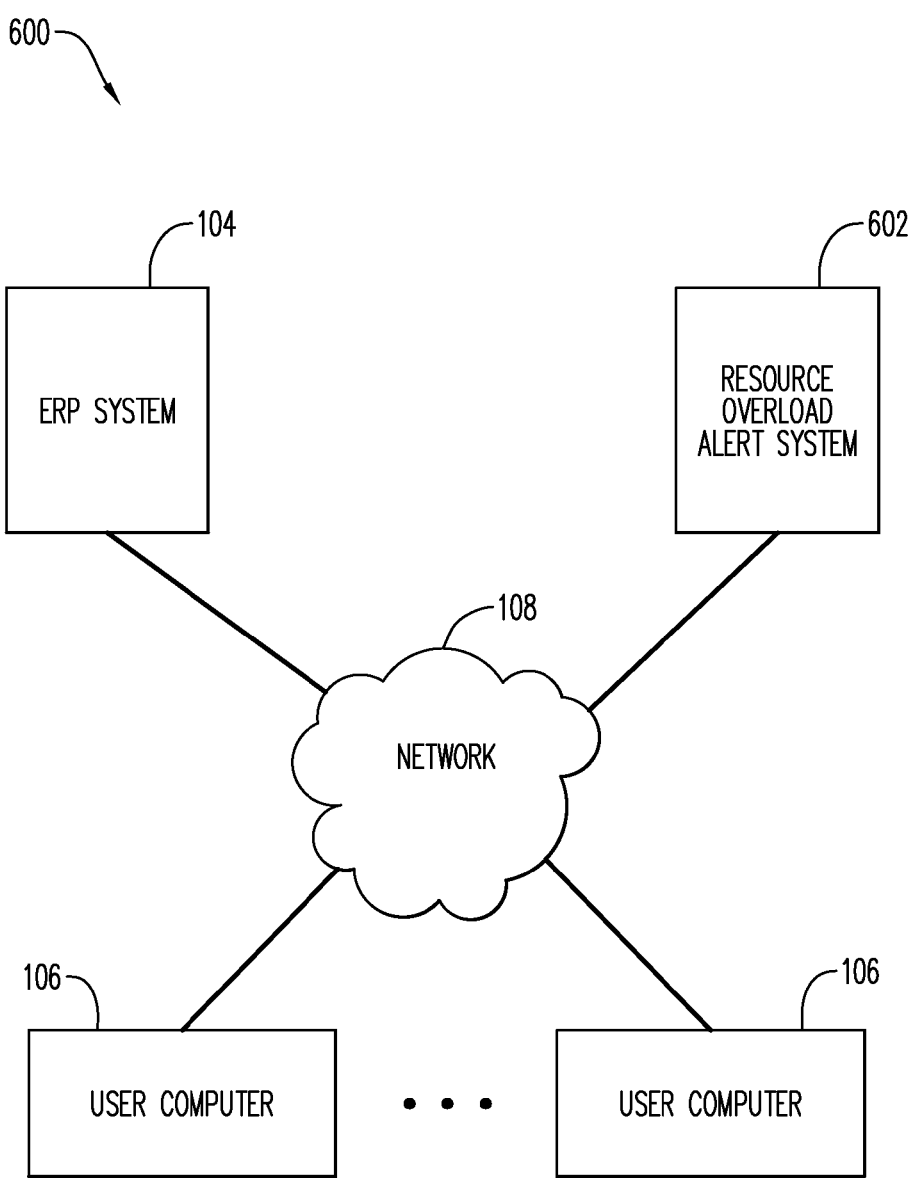
FIG. 6 is a block diagram representation of a data processing system according to some alternative embodiments.

FIG. 6 is a block diagram representation of a data processing system 600 according to some alternative embodiments. In its hardware aspects, the data processing system 600 may closely resemble the data processing system 100 described above in connection with FIGS. 1 and 2. The system components which are common to the systems 100 and 600, such as the ERP system 104, user computers 106 and data communication network 108, may be as described above. In place of the bottleneck identification system 102 shown in FIG. 1, a resource overload alert system 602 is included in the data processing system 600 of FIG. 6 and may have the same sorts of interrelationships with other system components as the bottleneck identification system 102 had with the other components of the data processing system 100 of FIG. 1. In some embodiments the systems 100 and 600 may be combined, and indeed the resource overload alert system 602 and the bottleneck identification system 102 may share the same server hardware and/or may be provided in a single application program or suite of application programs. In some embodiments of a combination of the systems 100 and 600, the combined system may include one server for implementing the resource overload alert system 602 and another server (preferably networked to the resource overload alert system 602) for implementing the bottleneck identification system 102.

The resource overload alert system 602 may operate in accordance with principles of the present invention to provide decision support to one or more individuals who manage a process such as a manufacturing process, a transaction servicing process or another process that passes a work item from one process resource to another. Details of the resource overload alert system 602 will be described below in conjunction with FIGS. 7-10.

In some embodiments (and as described below, for instance, in connection with FIG. 7), the data processing system 600 may comprise one or more processors. As used herein, a processor may be any type of processor. For example, a processor may be programmable or non programmable, general purpose or special purpose, dedicated or non dedicated, distributed or non distributed, shared or not shared, and/or any combination thereof. If the processor has two or more distributed portions, the two or more portions may communicate with one another through a communication link. A processor may include, for example, but is not limited to, hardware, software, firmware, hardwired circuits and/or any combination thereof.

In some embodiments, one or more portions of the data processing system 600 may be used without one or more other portions of the data processing system 600. In some embodiments, the data processing system 600 (or portion(s) thereof) may be used in association with one or more other systems (such as the system 100 or another system or systems which are not shown) or portion(s) thereof.

Figure 7:
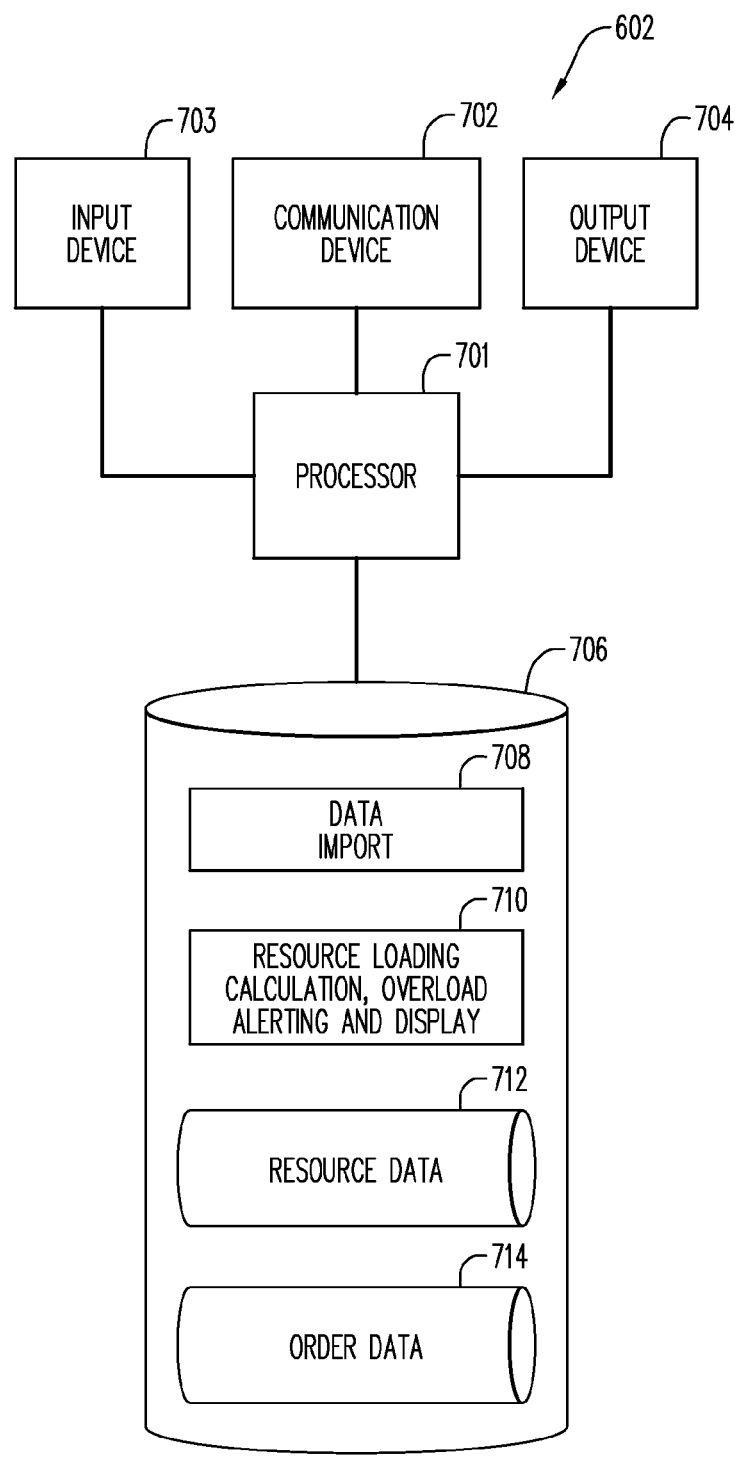
FIG. 7 is a block diagram representation of a resource overload alert system that is part of the system of FIG. 6.

FIG. 7 is a block diagram representation of the resource overload alert system 602. The hardware aspects of the resource overload alert system 602 may be the same as the hardware aspects described above with regard to the bottleneck identification system 102. In short, the resource overload alert system 602 may, in accordance with some embodiments, include a processor 701 operatively coupled to a communication device 702, an input device 703, an output device 704 and a storage device 706. The hardware components enumerated in the previous sentence may have the same characteristics and interrelationships as the corresponding hardware components of the bottleneck identification system 102. Consequently, the above description of the bottleneck identification system hardware is equally applicable to the hardware for the resource overload alert system 602. However, software programs and data stored on the storage device 706 of the resource overload alert system 602 may be different from the software and data stored on the storage device 206 of the bottleneck identification system, such that the resource overload alert system 602 may provide functionality such as that described below in conjunction with FIGS. 8-10.

The storage device 706 may store one or more programs 708, 710, which may include one or more instructions to be executed by the processor 701 to perform one or more functions of one or more embodiments of the invention as disclosed herein and/or one or more portions of one or more embodiments of one or more methods disclosed herein.

For example, the program 708 may allow the resource overload alert system 602 to receive and/or import data (e.g., from ERP system 104) that represents characteristics of processes and/or process resources to be managed with the aid of the data processing system 600. Examples of process resources are machine tools used to manufacture a work item. The program 708 may also allow the resource overload alert system 602 to receive and/or import data indicative of planned activities for the process resources. For example, the latter type of data may include orders for goods to be manufactured and indications as to when and to what extent the orders will result in utilization of machine tools.

The program 710 may allow the resource overload alert system 702 to manipulate and/or process the data imported via the program 708 so that the resource overload alert system 702 may identify future time periods when one or more resources are likely to be overloaded, to alert one or more users concerning the potential for resource overload(s) and to provide displays to users to indicate, for individual resources, expected degrees of loading with respect to future time periods.

The storage device 706 may store one or more databases 712, 714. For example, database 712 may store data that indicates characteristics of process resources such as machine tools used in a manufacturing process. Data stored in the database 712 concerning the process resources may include the capacity of the process resource, which may be indicated by number of work items per unit time that the process resource is able to process. Still other data concerning each process resource may indicate the amount of time that each process resource requires to perform its processing relative to a work item (i.e., time required by the process resource to complete a task). Alternatively, the amount of time required for a particular resource to complete a task may, at least in some cases, vary depending on attributes of the task to be performed. That is, the task to be performed by a particular resource may vary from order to order, and may be an attribute represented by the order data to be described below rather than being an attribute of the process resource itself. Similarly, the capacity of a process resource may be partly a function of one or more attributes of the particular task required of the process resource in connection with a particular order.

The resources represented by the data in database 212 are not necessarily physical objects. For example, at least some of the resources may be organizational and/or human resources. In one example, the resources may include machine tools, qualified operators for the machine tools, test equipment and transportation equipment such as forklifts.

In some embodiments, some or all of the data in the resource database 712 may be imported by the resource overload alert system 602 from the ERP system 104.

The data in the database 714 may represent a group of orders or another set of tasks to be processed through a production system (e.g., a manufacturing facility) that is to be managed using the data processing system 600. The data for each order or other task may specify the number of work items to be produced or processed, as well as the timing of production, and possibly also the demands each work item will place on the process resources required to produce or process the work item.

In some embodiments, some or all of the data in the order database 714 may be imported by the resource overload alert system 602 from the ERP system 104.

In some embodiments, one or more of the databases may be used in carrying out one or more portions of one or more functions disclosed herein and/or to carry out one or more portions of one or more embodiments of one or more methods disclosed herein.

Other programs and/or databases may also be employed.

Figure 8:
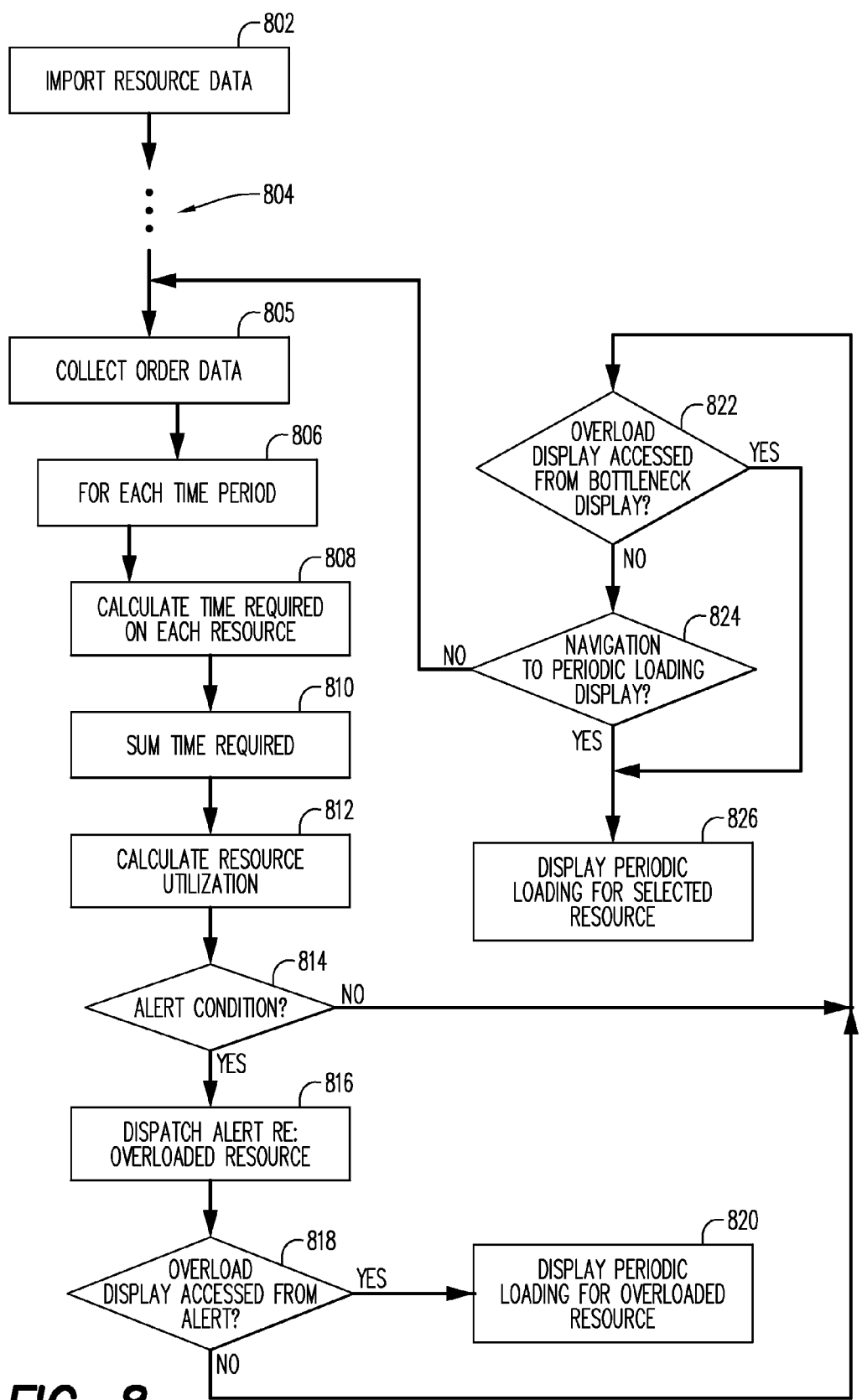
FIG. 8 is a flow chart that illustrates a process that may be performed in the system of FIG. 6 for displaying resource loading in connection with an operational process to be managed using the system of FIG. 6.

FIG. 8 is a flow chart that illustrates a process that may be performed in the data processing system 600 for displaying resource loading in connection with an operational process to be managed using the data processing system 600.

At 802 in FIG. 8, the resource overload alert system 602 operates to import (e.g., from the ERP system 104) the resource data as described above in connection with resource database 712. Thereafter, (perhaps after a delay indicated by ellipsis 804) the resource overload alert system 602 collects (805 in FIG. 8), in any suitable manner, order data that is relevant to the expected future level of utilization of some or all of the resources included in a production or processing system to be managed with the aid of the data processing system 600. For example, the resource overload alert system may import the order data from the ERP system 104. In addition, or alternatively, the resource overload alert system 602 may receive a feed of order data as new orders are entered into the data processing system 600.

The resource overload alert system 602 may be configured to calculate expected resource utilization levels for each of a predetermined number of future time periods up to a predetermined time horizon. For example, the resource overload alert system 602 may be configured to calculate expected resource utilization levels for each business day over the next 12 weeks. As another example, the resource overload alert system 602 may be configured to calculate expected resource utilization levels for each 8-hour shift over the balance of the current calendar month and for the next calendar month as well. In other possible configurations, the resource overload alert system 602 may calculate expected resource utilization levels at two or more levels of granularity over a period of time which extends up to a time horizon. For example, the resource overload alert system 602 may calculate expected resource utilization for each whole work week and for each business day over the next 12 weeks. Other possible time period granularities may include calendar months, bi-weeks and calendar quarters. Even hour-by-hour granularity is possible.

In any event, and referring again to FIG. 8, block 806 indicates that a sequence of following steps is to be performed for each time period for which the resource overload alert system 602 has been configured to calculate expected resource utilization levels. (The time periods may, but need not, be non-overlapping—i.e., not overlapping with each other.) The first of such steps is 808, at which, using the order data collected at 805, the resource overload alert system 602 (and/or its processor 701) calculates, for each order, the amount of time the order will require from each of the resources, for the time period in question, in the system to be managed with the aid of the data processing system 600. The calculation at 808 may be based on both characteristics of the order in question, such as the timing at which the order is expected to be processed, and the size of the order (e.g., number of work items to be produced), as well as characteristics of the resource in question, such as the throughput of which the resource is capable.

At 810, the resource overload alert system 602 (and/or its processor 701) sums, over each resource, the total time required from the resource by all of the orders relevant to the time period in question. That is, for each resource, a relevant subset of the data resulting from step 808 is summed.

The data resulting from step 810, for each resource, represents, or may be readily converted into, data indicative of the extent to which the resource's capacity will be required during the time period in question. Based on this data, and also based on the "total capacity" of the resource, a resource utilization percentage (also referred to as a "metric") is calculated at 812 for each resource. In practice, there may be a number of different ways in which the resource utilization (RU) metric may be calculated. For example, RU may be calculated as the quotient of the expected resource load generated at 810 divided by the theoretical maximum load for the resource in question. Reference is made to the concrete example which is stated above in connection with the explanation of step 412.

In other embodiments, RU may be calculated as the quotient of expected resource load divided by a maximum load as determined for the resource based on actual experience with the resource during periods of maximum throughput. Thus RU in this case may reflect experience with actual operating conditions rather than a theoretical maximum load. Other approaches to calculating RU may alternatively be used, as noted above in connection with step 412.

Following step 812 is a decision block 814. At decision block 814, the resource overload alert system 602 determines, with respect to each resource in the system to be managed, and with respect to each future time period that the resource overload alert system 602 is configured to consider, whether the resource in question is expected to be loaded in the time period in question to such an extent that an alert should be generated. That is, the resource overload alert system 602 determines whether the resource in question is expected to be overloaded for the time period in question. This determination may be made, for example, by comparing the RU for the resource for the time period with a threshold, such as 100% or 95% or 90%, etc. (It need not be the case that the same threshold is employed for every resource.) If the RU for the resource for the time period equals or exceeds the threshold, then the resource overload alert system 602 may determine that an alert condition exists for the resource for the time period in question.

If a positive determination is made at 814 (i.e., if an alert condition was found to exist), then step 816 may follow. At 816, the resource overload alert system 602 may transmit an alert notice or warning to the user computer 106 and/or the mobile device for one or more designated users who are charged with managing the resource for which the alert condition was found. The alert notice or warning may take the form of an electronic mail message, a text message, etc. In some embodiments, the alert notice or warning may include a hyperlink or other feature which the user may actuate to access a display which provides information about the overload condition.

At 818 is a decision block at which the resource overload alert system 602 determines whether a user has opted to access, via the alert message, the display concerning the overload condition. If so, then at 820 the resource overload alert system 602 provides to the user (e.g., via a user computer 106, mobile device, etc.) a display which presents the expected utilization of the resource in question over a sequence of future time periods. An example of such a display is presented in FIG. 9.

Figure 9:
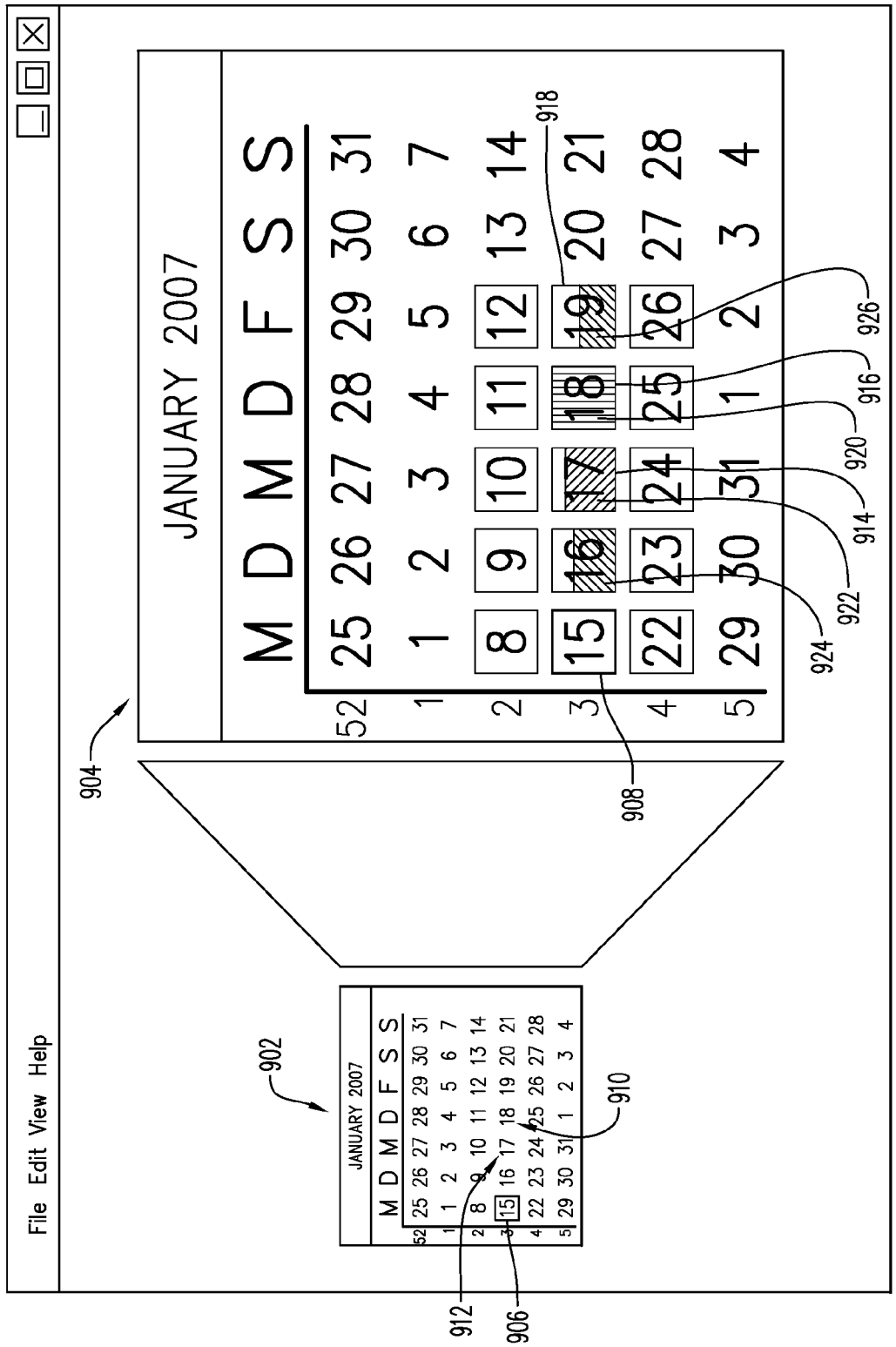
FIGS. 9 and 10 illustrate example decision support screen displays that may be produced in the process of FIG. 8.

For the purposes of the example screen display shown in FIG. 9, it is assumed that that the resource overload alert system 602 was configured to consider time periods at a granularity of one business day. It is further assumed either that the order data considered by the resource overload alert system 602 was only available for the current work week (assumed for purposes of illustration to be the week of Jan. 15, 2007) or that no orders had been received that would load the resource in question beyond the current work week.

Referring to FIG. 9, the screen display shown therein includes a small calendar representation 902 corresponding to the current calendar month, and a large calendar representation 904 that also corresponds to the current calendar month. As is conventional in printed calendars as well as many calendars displayed by computers and like devices, each row of the calendar representations 902, 904 corresponds to a calendar week, and each column corresponds to a certain day of the week (Monday, Tuesday, etc.) for each of the calendar weeks shown in the calendar representation.

In accordance with some embodiments, the large calendar representation 904 may not initially be shown in the screen display, but may pop up upon the user interacting with (e.g., mousing over or clicking on) the small calendar representation 902. Prior to the large calendar representation being displayed, the screen display may show calendar representations (not shown) for subsequent calendar months displayed in the same size as the small calendar representation 902.

In the particular example shown, the large calendar representation 904 is about three times as large (in linear dimension) as the small calendar representation 902; however, the ratio of the sizes of the two calendar representations may be different from 3.

In accordance with conventional practices, there may be a frame 906, 908 (in representations 902 and 904, respectively) in a suitable color such as blue, placed around the same calendar day numeral in both representations to indicate the current date (in this case the 15$^{th}$ day of the month).

It is assumed for purposes of the present example display that an expected overload condition for January 18 was found for the resource for which the display is presented. Therefore, according to an aspect of the present invention, the numeral "18" (indicated by reference numeral 910) in the small calendar representation 902 may be displayed in a highly visible color such as red. Alternatively, for example, the numeral "18" may displayed against the background of a red color block (not shown) sized to provide a background only for the numeral "18". In such a case, the numeral "18" may be presented in black, or more preferably in white so as to contrast even more visibly with the red color block. As another alternative, a red frame may be provided around the numeral "18" in the small calendar representation 902

It is further assumed for purposes of the present example that an RU close to the overload condition was calculated for the resource in question for January 17. Consequently, according to another aspect of the invention, the numeral "17" (indicated by reference numeral 912) in the small calendar representation 902 may be displayed in a highly visible color (e.g., yellow) that is different from the color in which the numeral "18" was displayed. As before, instead of displaying the numeral in yellow, a yellow color block (not shown) may be displayed behind the numeral "17" and the numeral "17" may be displayed in a contrasting color such as black. As another alternative, a yellow frame may be presented around the numeral "17" in the small calendar representation 902. (In some embodiments, a resource may be considered "close" to being overloaded when the RU for a given day exceeds a threshold such as 80%, whereas a resource may be considered overloaded when the RU for the day exceeds 95%.)

It is further assumed that the resource overload alert system 602 did not find an overload or near-overload for the resource for any other day in January, so that the calendar day numerals in the small calendar representation 902 for all of the other days may be a neutral color such as grey or black, and/or no other calendar day numeral may be presented against a high-visibility background.

The large calendar representation 904 may present in a more readable form the same information contained in the small calendar representation 902, while also presenting additional information in accordance with aspects of the present invention. For example, in addition to the frame 908 around the calendar date numeral "15" in the large calendar representation 904, each of the other calendar date numerals for the business days in the week of the 15$^{th}$ and for the immediately preceding and succeeding week may also have a frame around them. For example, the frames around the calendar date numerals "17", "18" and "19" are respectively indicated by reference numerals 914, 916, 918. In accordance with aspects of the present invention, the frames may be considered to represent "fill zones" in the sense that, as will be seen, at least some of the frames may be partially or entirely filled with indications that represent the respective RUs for the resource in question for the corresponding calendar days. Preferably all of the fill zones are of the same size. It will be observed that the fill zones may be arrayed in a two-dimensional array in correspondence with the layout of the large calendar representation 904. The fill zones are to be considered as arrayed "in correspondence with" the layout of the large calendar representation 904 whether or not a respective fill zone is provided in association with every calendar numeral.

For example, and bearing in mind that the resource in question was found to be overloaded for January 18, the fill zone 916 corresponding to that date may be entirely filled by an indication 920 (represented by vertical hatching) that may be in a suitable color, such as red. The fill indication 920 may be partially transparent, so as to allow the calendar date numeral (in this case "18") to show through, or may alternatively be presented as a background for the calendar date numeral. Along with its highly visible color, the fact that the fill indication 920 entirely fills the fill zone 916 also is indicative of the information that the corresponding calendar day has been found to be overloaded for the resource in question.

Further, and bearing in mind that the resource in question was found to be close to overload for January 17, the fill zone 914 corresponding to January 17 may be largely filled, from its bottom edge, by a fill indication 922 (represented by inclined hatching). The fill indication 922 may be in a suitable highly visible color (such as yellow) that is different for the "overload color" that was used for the fill indication 920. As before, the fill indication 922 may be partially transparent or may be presented as a background to the calendar date numeral "17". The extent to which the fill indication 922 fills its respective fill zone 914 may be proportional to the RU calculated for the corresponding calendar day for the resource in question.

In this example display, the fill zones for the calendar days January 16 and 19 also are partially filled by, respectively, fill indications 924 and 926 (both represented by hatching that is inclined in a different direction from the hatching for fill indication 922). The fill indications 924 and 926 are both smaller in size than the fill indication 922, representing lower RUs calculated for January 16 and January 19. By the same token the fill indications 924, 926 (which may be the same color) may be of a relatively low visibility color such as blue or grey. As in the case of (at least) fill indication 922, the size of the fill indications 924, 926 may be in proportion to the RUs calculated for the respective calendar days for the resource in question.

Together, the fill zones and fill indications on the large calendar representation 904 present a "water tank" or "fuel tank" analogy by which the day-by-day degree of loading for the resource is conveyed to the user in a highly intuitive manner which the user can quickly and easily understand. Furthermore, the display of FIG. 9 may provide very helpful decision support to the user. For example, the display of FIG. 9 may aid the user in arriving at plausible remedies for the overload condition, such as shifting some of the utilization of the resource from the overloaded and/or near-overloaded time periods to time periods shown by the display to be lightly loaded.

The display shown in FIG. 9 may also display an indication (not shown), such as "Resource=welding machines" or "Resource=welding operators", to indicate what resource is the subject of the displayed loading information. However, this may not be necessary, and it may be desirable to omit any such indication to minimize clutter in the display. The identity of the resource may already be known to the user from the alert provided at 816 in FIG. 8, or may have been previously selected by the user for illustration, as in branches of the process of FIG. 8 that will be described below.

In some embodiments, moreover, the user may be able to call up the identity of the resource in question by, e.g., clicking or double clicking on one of the calendar date numerals. Such activity by the user may also cause a pop-up display that presents a numeral representation of the RU that the resource overload alert system 602 calculated for the corresponding calendar day for the resource in question.

In some embodiments, the small calendar representation 902 may be in a somewhat different format from that shown; for example, the small calendar representation 902 may be the same as the large calendar representation 904 except smaller in size. In other words, the small calendar representation may also have fill zones and fill indications.

Referring again to FIG. 8, consideration is again given to the decision block shown at 818. If a negative determination is made at 818 (i.e., if the user does not elect to navigate from the overload alert of step 816 to the display of FIG. 9), then the display of FIG. 9 may not be presented, and the resource overload alert system 602 may idle and/or may update RU calculation and alert determinations as new order data is received, subject however to decisions about user actions as portrayed in decision blocks 822 and 824.

At decision block 822, it is determined whether a user has chosen to navigate to a period-by-period utilization display for a given resource from a display such as the bottleneck display shown in FIG. 5. To elaborate, the user may be permitted, when viewing the display of FIG. 5, to click or double click on one of the image elements that corresponds to a resource (e.g., the image element 510 which represents the prime bottleneck or the image element 512 which represents the next-most-heavily-loaded resource). By doing so, the user accesses the resource overload alert system 602, which displays (as indicated at 826 in FIG. 8) a display like FIG. 9 for the resource represented by the image element in FIG. 5 on which the user clicked. Thus, after noting the bottleneck via the display of FIG. 5, the user may access the display of FIG. 5 to inform himself/herself of the expected loading of the bottleneck resource over time. This may help the user arrive at potential remedies (e.g., rescheduling work) to the problem presented by the bottleneck.

The user may also, in some embodiments, be enabled to readily navigate from the display of FIG. 9 to the display of FIG. 5. For example, if the user were to click on a calendar date numeral in FIG. 9 that is displayed in red (or with a red fill indication, etc.), doing so may cause the bottleneck display of FIG. 9 to be displayed in place of the display of FIG. 9.

Referring again to FIG. 8, at decision block 824, it is determined whether the user indicated a desire to navigate to the display shown in FIG. 9 in another manner. For example, the user may be permitted to interact with a menu (not shown) or a series of menus, by which the user may select a process resource and also may select a menu option such as "periodic loading display". By doing so, again the user may access a display in the format shown in FIG. 9, even if no overload alert has been issued for the selected resource and even though the selected resource is not currently the primary or secondary bottleneck. Even in such cases, the fill zone/fill indication display of FIG. 9 (presumably lacking an indication of overload or near overload in such cases), may still be very helpful to a user in deciding whether to accept an order, or in deciding how to schedule an order.

Figure 10:
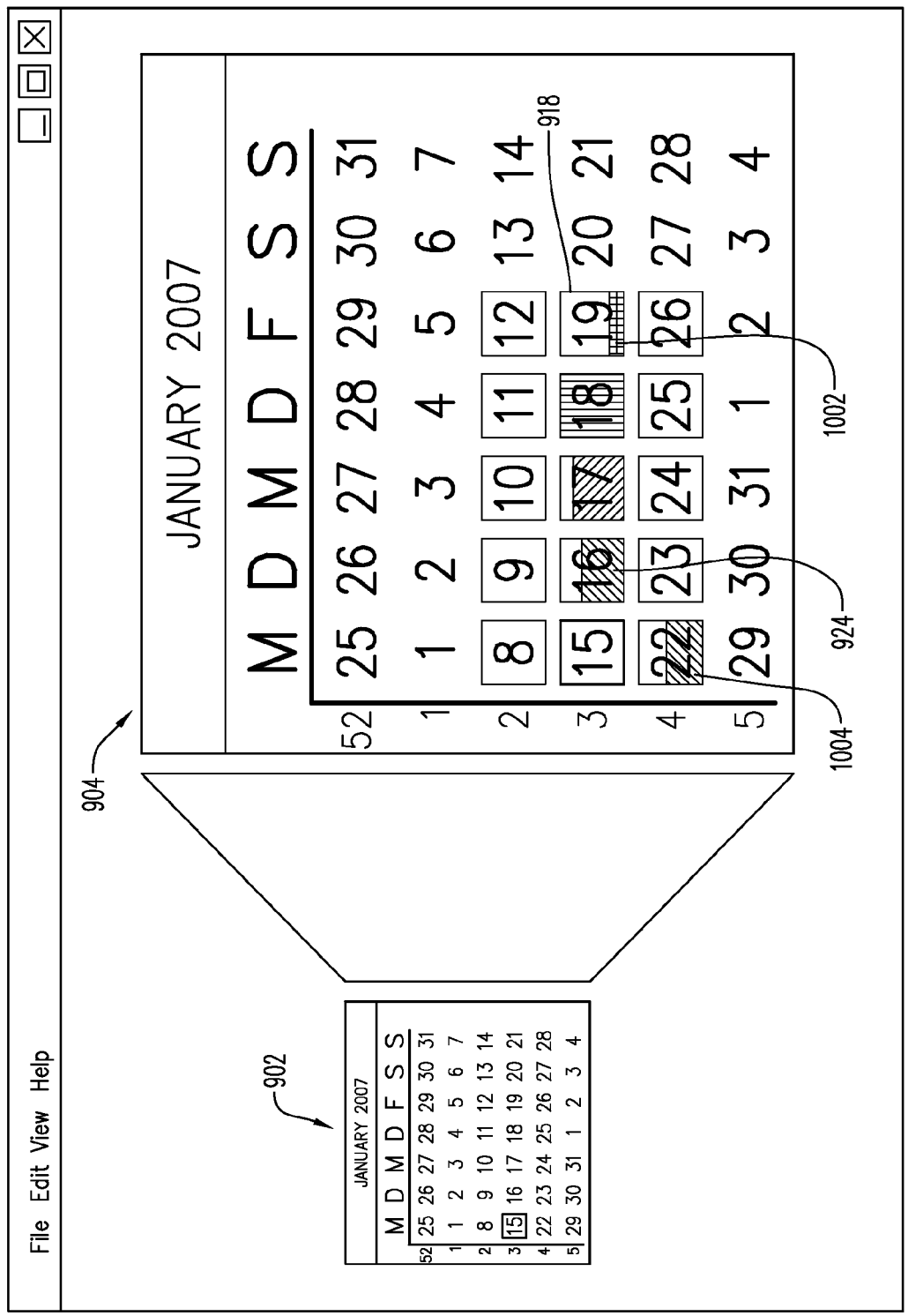

FIG. 10 shows another example of a screen display of the type shown in FIG. 9. The screen display of FIG. 10 may have all the features described above with reference to FIG. 9, and may have some additional features as well. For purposes of the example of FIG. 10, it is assumed that the expected loading of the resource in question is the same as in the example of FIG. 9, as to the $16^{th}$, $17^{th}$ and $18^{th}$ of January, but that the expected loading of the resource on the $19^{th}$ of January is assumed to be much less than was assumed to be the case for the example of FIG. 9, and less than an "underload" threshold (which may be, e.g., 20%). To reflect this fact, the fill indication 1002 in the fill zone 920 for the $19^{th}$ of January may be of a different color (e.g., green) than the red, yellow, and grey or blue fill indication colors discussed in connection with FIG. 9. (The green color of the fill indication 1002 is represented by square hatching in FIG. 10.) The size of the fill indication 1002 is in proportion to the (relatively low) RU that was calculated for the resource in question for the corresponding calendar day.

Correspondingly, in FIG. 10 the numeral "19" in the small calendar representation 902 may be displayed in green, or in association with a green color block (not shown), or with a green frame, so that the small calendar representation 902 also indicates the relatively light loading of the resource in question expected for January 19.

Returning for a moment to the large calendar representation in FIG. 10, in the event that the resource in question is completely unloaded on a given business day (i.e., RU=0 for that business day) the corresponding calendar date numeral may be presented in green, and/or with a green frame, in lieu of the green fill indication described above.

The additional feature of FIG. 10, as described in the previous paragraphs, may be particularly useful if the process to be managed is one with a "push" mode of production, in which the product is, e.g., a commodity to be made for stock. In such processes, it is often desirable to operate the production facility near or at full capacity. Where that is the goal, it may be very helpful to have the "green=underloaded" indication so that the user/manager may react to the potential underload with actions to keep the production facility fully loaded.

Contrariwise, where the facility activity is largely or entirely driven by orders (what some would call a "pull" situation), the overload alerting and overload indications discussed in connection with FIGS. 8 and 9 may be of particular usefulness.

To complete the discussion of FIG. 10, it will be noted that a fill indication 1004 is shown at the calendar date numeral "22" in the large calendar representation 904. This is an indication of expected loading of the resource in question on January 22. For purposes of the present example, it is assumed that a moderate degree of loading is expected on that date, and the color of the fill indication 1004 may accordingly be the same as the fill indication 924 provided at the calendar date numeral "16" in the large calendar representation 904.

While certain display colors have been described hereinabove as having certain meanings, it may be the case in a preferred embodiment of the invention that the color scheme may be customizable by the user and/or the system administrator, so that the user/system administrator may select the various colors to be used to indicate the degrees of loading of the resource from time period to time period. Moreover, whether or not the color coding scheme is customizable, the default (or only) color coding scheme may be different from the color coding scheme described above. Thresholds for the various conditions (e.g., overload, near-overload, underload) may also be customizable by the user and/or system administrator.

The displays shown herein in connection with FIGS. 9 and 10 cover a time range of one calendar month, with resource loading presented at a day-by-day granularity. Variations in either or both respects may be provided, however. For example, the granularity may be hour-by-hour, shift-by-shift (where each shift may be 8 hours), week-by-week, month-by-month, calendar-quarter-by-calendar-quarter, etc. The time range covered may be shorter or longer than one month. A twelve-week time range may be particularly useful in some applications.

In some embodiments, the resource overload alert system 602 may operate such that the display shown in FIG. 9 is provided for a given resource only if the resource in question is expected to be loaded at least to a certain extent (i.e., RU greater than a certain threshold) during at least one future time period.

The displays of FIGS. 9 and 10 have been described on the basis that they represent an accumulation of loading of the resource based on a plurality of orders. Alternatively, however, a display in the format of FIG. 9 or 10 may be provided to illustrate how a single order, or proposed order, would load a particular resource over a certain time range.

Further, displays in the format of FIG. 9 or 10 may be employed to explore "what if" scenarios and simulations, as an alternative to using such displays for orders that are actually on the books.

As an alternative to filling a respective fill zone from the bottom edge, a fill indication may fill the fill zone from the top edge, from the left edge, from the right edge or in another direction (e.g., diagonally).

In some embodiments, users may receive overload alerts from the resource overload alert system 602 only if they have subscribed to receive the alerts or otherwise indicated an interest in receiving the alerts.

Either or both of the data processing system 100 and the data processing system 600 (which may be combined, as noted above) may operate to provide suggested solutions to users for the purpose of addressing bottlenecks, overloads, underloads, etc. The suggested solutions may include, for example, permissible deferrals of scheduled maintenance, or rescheduling of certain orders.

As used herein, the term "order" refers not only to orders from customers or other activities in which a resource produces or processes a work item, but also refers to any planned activity (e.g., maintenance, overhaul, training, vacation, annual plant closure, cleaning, adjustment, prototyping, testing, inspection, set-up, change-over, tear-down, etc.) that is expected to occupy or partially occupy the resource. The "utilization" or "loading" of a resource may include any of the activities referred to in the previous sentence.

The term "resource" includes (in addition to plant and equipment and human resources) storage space (including, e.g., vacant land), adjustment devices, transportation devices, and material to be processed. A "resource" may include, e.g., a single machine tool or a group of similar machine tools. Thus a resource may be a single item or a group of similar or related items.

While method steps have been described as occurring in a certain order, and/or have been illustrated in the drawings as occurring in a certain order, nevertheless the disclosure herein is not intended to imply a fixed order in which the method steps are to be performed. Rather, the method steps may be performed in any order that is practicable.

In some embodiments, one or more portions of one or more embodiments disclosed herein may be embodied in a method, an apparatus, a computer program product, and/or a storage medium readable by a processing system. As the term is used herein and in the appended claims, a "medium" or "storage medium" need not be removable, and may for instance include a hard disk drive and/or solid state memory.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

While various embodiments have been described, such description should not be interpreted in a limiting sense. It is to be understood that other embodiments may be practiced without departing from the spirit and scope of the invention, as recited in the claims appended hereto.

What is claimed is:

1. A method comprising:
    defining a sequence of process resources, each of said process resources for performing at least one respective task on a work item;
    calculating a resource utilization metric for each of the process resources, said resource utilization metric for said each resource indicative of an extent to which said each resource is expected to be utilized during a period of time; and
    displaying a representation of at least a portion of the sequence of process resources, said representation including a plurality of image elements each corresponding to a respective one of said process resources;
    wherein:
        each of said image elements has a respective dimension in a certain direction; and
        the respective dimension of each of said image elements in said certain direction is inversely proportional to the calculated resource utilization metric for the respective process resource to which said each image element corresponds.

2. The method of claim 1, wherein the certain direction is a Y-axis direction.

3. The method of claim 2, wherein each of the image elements is a rectangle.

4. The method of claim 3, wherein each of the image elements has an X-axis dimension that is proportional to a length of time required to perform the respective at least one task by the respective process resource to which said each image element corresponds.

5. The method of claim 2, further comprising:
    identifying a one of said image elements that has a smaller Y-axis dimension than any other of said image elements; and
    color-coding said identified one of said image elements.

6. The method of claim 5, wherein said identified one of said image elements is displayed in red.

7. The method of claim 2, wherein said image elements are displayed as a linear array of rectangles with a respective trapezoid displayed between each adjacent pair of rectangles.

8. The method of claim 2, wherein the process resources include machine tools.

9. The method of claim 8, wherein:
    the sequence of process resources is a first sequence of process resources; and
    the displayed representation is a first representation;
    the method further comprising:
        defining a second sequence of process resources, the process resources of the second sequence including categories of human resources associated with said machine tools;
        calculating the resource utilization metric for each process resource of the second sequence of process resources; and
        displaying a second representation in parallel with the first representation, the second representation for representing at least a portion of the second sequence of process resources, said second representation including a plurality of image elements each corresponding to a respective one of said process resources of said second sequence of process resources;
    wherein:
        each of said image elements of said second representation has a respective Y-axis dimension; and
        the respective Y-axis dimension of each of said image elements of said second representation is inversely proportional to the calculated resource utilization metric for the respective process resource to which said each image element corresponds.

10. An apparatus comprising:
    a processor; and
    a memory coupled to the processor and storing program instructions, the processor operative with the program instructions to:
        define a sequence of process resources, each of said process resources for performing at least one respective task on a work item;
        calculate a resource utilization metric for each of the process resources, said resource utilization metric for said each resource indicative of an extent to which said each resource is expected to be utilized during a period of time; and
        display a representation of at least a portion of the sequence of process resources, said representation including a plurality of image elements each corresponding to a respective one of said process resources;
    wherein:
        each of said image elements has a respective dimension in a certain direction; and
        the respective dimension of each of said image elements in said certain direction is inversely proportional to the calculated resource utilization metric for the respective process resource to which said each image element corresponds.

11. The apparatus of claim 10, wherein the certain direction is a Y-axis direction.

12. The apparatus of claim 11, wherein each of the image elements is a rectangle.

13. The apparatus of claim 12, wherein each of the image elements has an X-axis dimension that is proportional to a length of time required to perform the respective at least one task by the respective process resource to which said each image element corresponds.

14. The apparatus of claim 11, wherein the processor is further operative with the program instructions to:
identify a one of said image elements that has a smaller Y-axis dimension than any other of said image elements; and
color-code said identified one of said image elements.

15. The apparatus of claim 11, wherein the process resources include machine tools.

16. The apparatus of claim 15, wherein:
the sequence of process resources is a first sequence of process resources;
the displayed representation is a first representation; and
the processor is further operative with the program instructions to:
define a second sequence of process resources, the process resources of the second sequence including categories of human resources associated with said machine tools;
calculate the resource utilization metric for each process resource of the second sequence of process resources; and
display a second representation in parallel with the first representation, the second representation for representing at least a portion of the second sequence of process resources, said second representation including a plurality of image elements each corresponding to a respective one of said process resources of said second sequence of process resources;
wherein:
each of said image elements of said second representation has a respective Y-axis dimension; and
the respective Y-axis dimension of each of said image elements of said second representation is inversely proportional to the calculated resource utilization metric for the respective process resource to which said each image element corresponds.

17. An article of manufacture comprising:
a computer usable medium having computer readable program code means embodied therein for displaying a representation of a process, the computer readable program code means in said article of manufacture comprising:
computer readable program code means for defining a sequence of process resources, each of said process resources for performing at least one respective task on a work item;
computer readable program code means for calculating a resource utilization metric for each of the process resources, said resource utilization metric for said each resource indicative of an extent to which said each resource is expected to be utilized during a period of time; and
computer readable program code means for displaying said representation, said representation illustrative of at least a portion of the sequence of process resources, said representation including a plurality of image elements each corresponding to a respective one of said process resources;
wherein:
each of said image elements has a respective dimension in a certain direction; and
the respective dimension of each of said image elements in said certain direction is inversely proportional to the calculated resource utilization metric for the respective process resource to which said each image element corresponds.

18. The article of manufacture of claim 17, wherein the certain direction is a Y-axis direction.

19. The article of manufacture of claim 18, wherein each of the image elements is a rectangle.

20. The article of manufacture of claim 19, wherein each of the image elements has an X-axis dimension that is proportional to a length of time required to perform the respective at least one task by the respective process resource to which said each image element corresponds.

21. The article of manufacture of claim 18, wherein the computer readable program code means in said article of manufacture further comprises:
computer readable program code means for identifying a one of said image elements that has a smaller Y-axis dimension than any other of said image elements; and
computer readable program code means for color-coding said identified one of said image elements.

22. The article of manufacture of claim 18, wherein the process resources include machine tools.

23. The article of manufacture of claim 22, wherein:
the sequence of process resources is a first sequence of process resources; and
the displayed representation is a first representation;
the computer readable program code means in said article of manufacture further comprises:
computer readable program code means for defining a second sequence of process resources, the process resources of the second sequence including categories of human resources associated with said machine tools;
computer readable program code means for calculating the resource utilization metric for each process resource of the second sequence of process resources; and
computer readable program code means for displaying a second representation in parallel with the first representation, the second representation for representing at least a portion of the second sequence of process resources, said second representation including a plurality of image elements each corresponding to a respective one of said process resources of said second sequence of process resources;
wherein:
each of said image elements of said second representation has a respective Y-axis dimension; and
the respective Y-axis dimension of each of said image elements of said second representation is inversely proportional to the calculated resource utilization metric for the respective process resource to which said each image element corresponds.

* * * * *